(12) United States Patent  
Otani

(10) Patent No.: US 8,437,611 B2
(45) Date of Patent: May 7, 2013

(54) REPRODUCTION CONTROL APPARATUS, REPRODUCTION CONTROL METHOD, AND PROGRAM

(75) Inventor: Eiji Otani, Kanagawa (JP)

(73) Assignee: Sony Corporation, Tokyo (JP)

( * ) Notice: Subject to any disclaimer, the term of this patent is extended or adjusted under 35 U.S.C. 154(b) by 323 days.

(21) Appl. No.: 12/858,066

(22) Filed: Aug. 17, 2010

(65) Prior Publication Data
US 2011/0064384 A1    Mar. 17, 2011

(30) Foreign Application Priority Data

Sep. 16, 2009  (JP) ................................. 2009-214502

(51) Int. Cl.
*H04N 9/80* (2006.01)
(52) U.S. Cl.
USPC ....................................................... 386/241
(58) Field of Classification Search .................. 386/200, 386/241, 224, 343
See application file for complete search history.

(56) References Cited

U.S. PATENT DOCUMENTS 5,887,111 A * 3/1999 Takahashi et al. ............ 386/326
2006/0036948 A1* 2/2006 Matsuzaka .................... 715/723

FOREIGN PATENT DOCUMENTS

JP       2004-180290       6/2004

* cited by examiner

*Primary Examiner* — Huy T Nguyen
(74) *Attorney, Agent, or Firm* — Oblon, Spivak, McClelland, Maier & Neustadt, L.L.P.

(57) ABSTRACT

A computer-implemented method for slow-motion reproduction of video data including a plurality of frames stored on a storage device. The method includes receiving a frame from the plurality of frames stored on the storage device. The method further includes extracting at least one feature from the received frame. Additionally, the method includes comparing the at least one extracted feature with a plurality of pre-determined features. The method also includes reproducing the received frame at a slow-motion reproduction rate upon determination that the at least one extracted feature corresponds to at least one pre-determined feature from the plurality of pre-determined features. Further, the slow-motion reproduction rate is lower than a normal reproduction rate used for viewing the plurality of frames during normal playback.

20 Claims, 9 Drawing Sheets

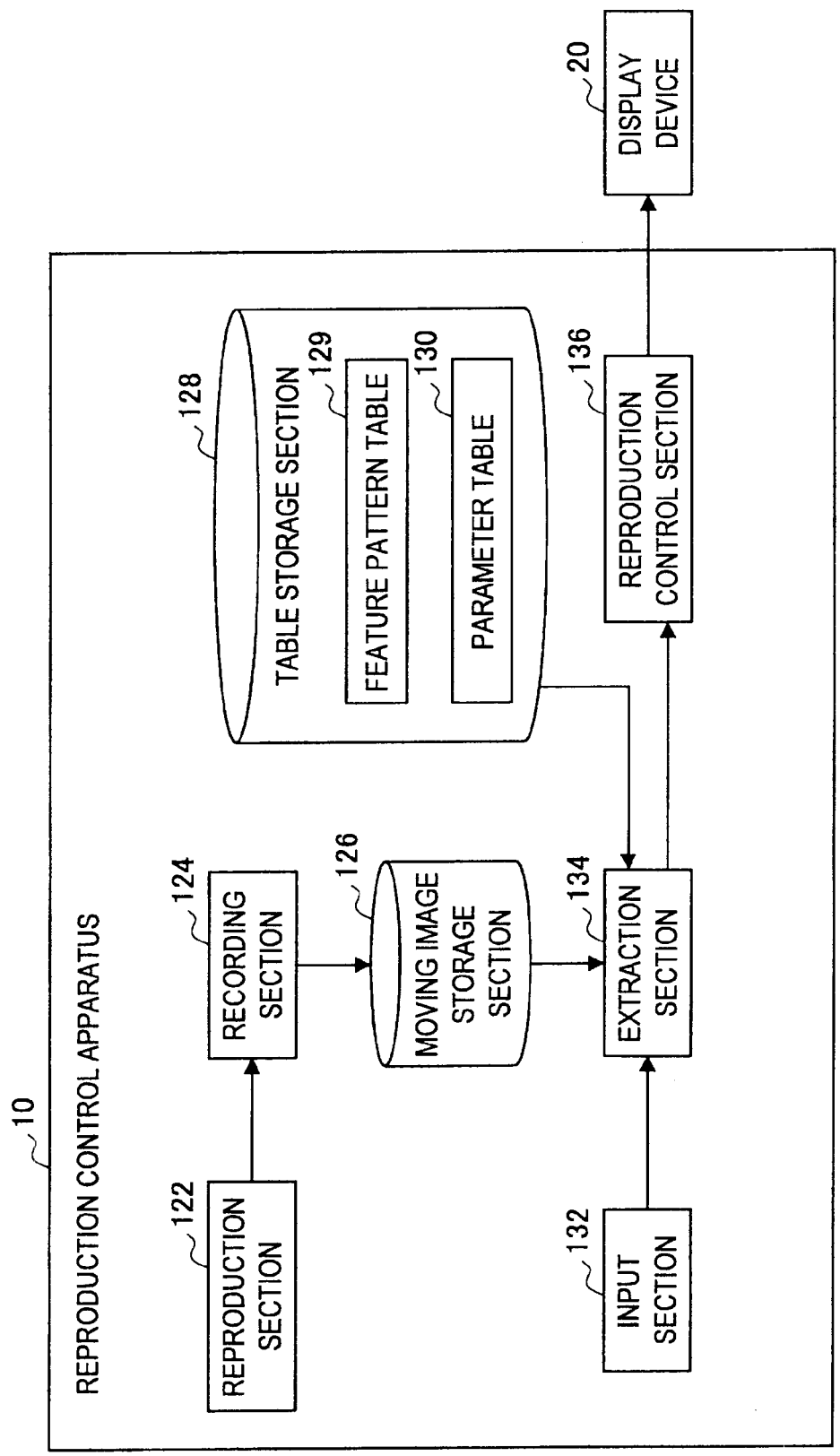

FIG.3

| SCENE | TIME INFORMATION | SOUND INFORMATION | COLOR INFORMATION | OTHER |
|---|---|---|---|---|
| SPORTS DAY | AROUND 10 OCT. | VOICE OF MANY CHILDREN | BLUE SKY AND SOIL COLOR | PHOTOGRAPHIC SUBJECT WEARS RED AND WHITE CAP, NUMBER OF PEOPLE IS LARGE |
| ENTRANCE CEREMONY | 4/B | ROOM REVERBERATION, VOICES OF MANY PEOPLE | — | CHERRY TREE, LETTERS ON SIGNBOARD, PEOPLE ARE IN LINE |
| GRADUATION CEREMONY | 3/E | ROOM REVERBERATION, VOICES OF MANY PEOPLE | — | CHERRY TREE, LETTERS ON SIGNBOARD, PEOPLE ARE IN LINE |
| SPORTS | — | BASEBALL: BATTER, PITCHER, SOCCER: GOAL, SHOOTING | GROUND IS SOIL COLOR | BASEBALL: SOCCER: SOCCER BALL, BALL KICKING MOTION |
| WEDDING | — | HYMN, GAGAKU | — | WEDDING DRESS |
| CAR WINDOW | — | SOUND INSIDE TRAIN, CAR, ETC. | — | MOTION VECTOR IS SMALL FOR DISTANT PLACE, MOTION VECTOR IS LARGE FOR NEARBY PLACE |
| ... | ... | ... | ... | ... |

129

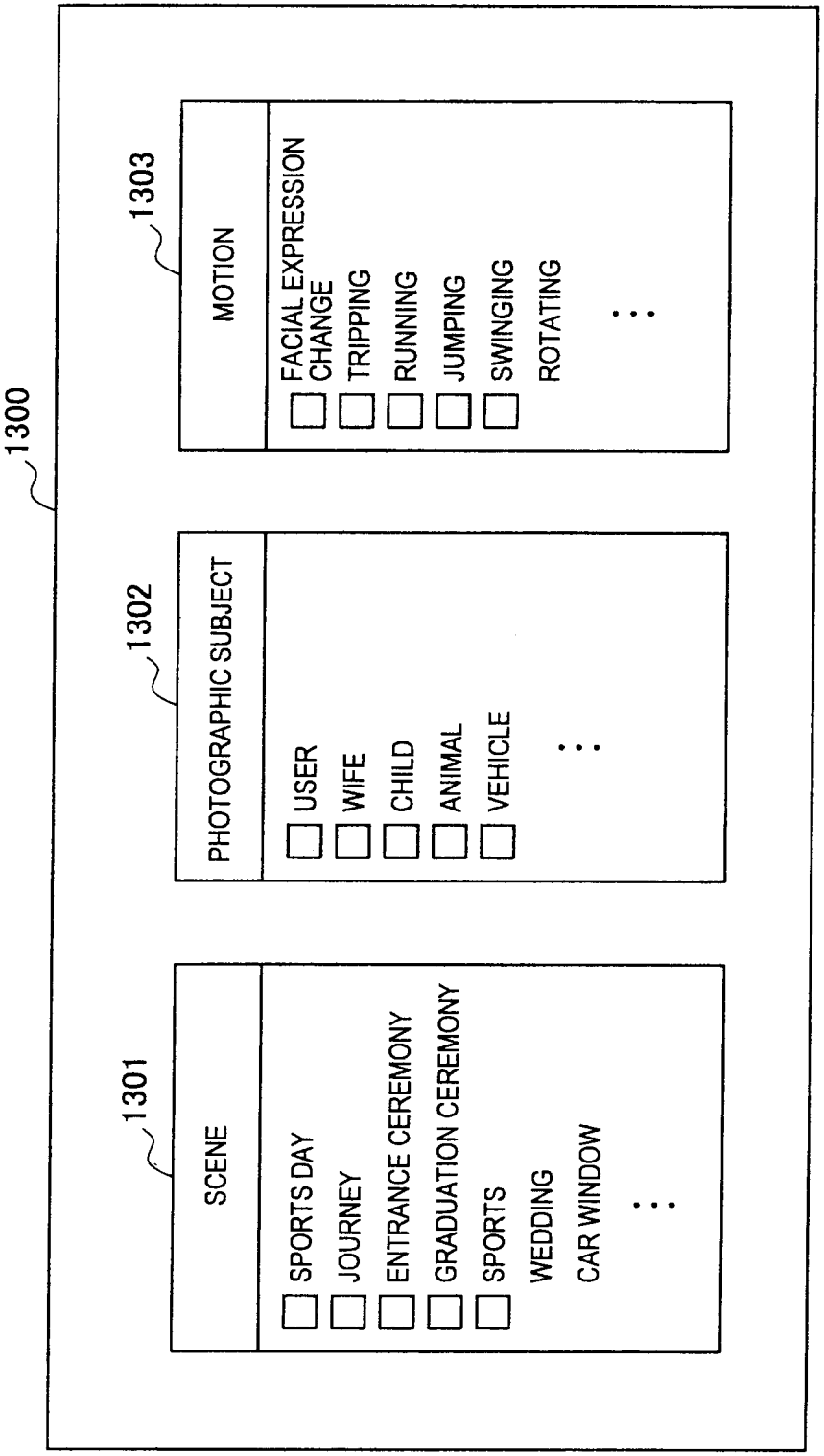

FIG.5

SLOW-MOTION REPRODUCTION PARAMETER 130

| SCENE | PHOTOGRAPHIC SUBJECT | MOTION | RATE | NUMBER OF TIMES | TIME PERIOD | START POSITION | MUSIC |
|---|---|---|---|---|---|---|---|
| 1. SPORTS DAY | CHILD | RUNNING | x2 | 1 | 10sec | -5sec | ON |
| 2. SPORTS DAY | CHILD | TRIPPING | x4 | 2 | 5sec | -3sec | ON |
| 3. | CHILD | FACIAL EXPRESSION CHANGE | x4 | 2 | 5sec | -3sec | ON |
| 4. SPORTS | ALL | SWINGING | x2 | 1 | 5sec | -5sec | OFF | ns
REPRODUCTION CONTROL APPARATUS, REPRODUCTION CONTROL METHOD, AND PROGRAM

CROSS REFERENCE TO RELATED APPLICATIONS

The present application claims priority under 35 U.S.C. §119(a)-119(d) to Japanese Priority Patent Application JP 2009-214502 filed in the Japan Patent Office on Sep. 16, 2009, the entire content of which is hereby incorporated by reference.

BACKGROUND OF THE INVENTION

1. Field of the Invention

The present invention relates to a reproduction control apparatus, a reproduction control method, and a program.

2. Description of the Related Art

In recent years, consumer video cameras have been widely used, and it has become common that many people own video cameras at home and keep records of the growth of a child and everyday life such as various kinds of events. As the functions desired for a video camera, there can be exemplified higher image quality of a display device owing to the spreading of Hi-Vision and long-duration recording from a tape or a DVD to a hard disk. Further, there is newly appeared a video camera having functions of photographing at a frame rate higher than a normal frame rate and performing slow-motion reproduction at the time of reproduction.

For example, there is disclosed a technology which, with respect to a moving image generated by changing frame rate, enables to easily adjust a reproduction rate at the time of reproduction (e.g., Japanese Patent Application Laid-Open No. 2004-180290). In particular, with regard to a broadcast content, a technique involving performing slow-motion reproduction of an important scene or a highlight scene is widely used. Also from the user side, the technique of slow-motion reproduction enables the user to readily realize an interesting video effect and to enhance a value of video besides the image quality.

SUMMARY

Meanwhile, in the past, a user who owned a video camera generally used, when reproducing recorded moving image information, a method of watching/listening to the photographed video by reproducing the video as it was. Among experienced users, there are some people who enjoy value-added video which is edited by adding various kinds of video effects, for example, inserting tickers into photographed content and performing slow-motion reproduction. However, in order to perform those editing operations, there was an issue that a long time period was necessitated even for an experienced user to perform the editing operations, because it was necessary to create a video editing environment such as software and hardware.

In light of the foregoing, it is desirable to provide a novel and improved reproduction control apparatus, reproduction control method, and program, which are capable of detecting a scene that is suitable for slow-motion reproduction and performing the slow-motion reproduction of the scene.

According to the embodiments of the present invention described above, a scene that is suitable for slow-motion reproduction can be detected and the scene can be reproduced in slow motion.

Embodiments are related to a computer-implemented method for slow-motion reproduction of video data including a plurality of frames stored on a storage device. The method includes receiving a frame from the plurality of frames stored on the storage device. The method further includes extracting at least one feature from the received frame. Additionally, the method includes comparing the at least one extracted feature with a plurality of pre-determined features. The method also includes reproducing the received frame at a slow-motion reproduction rate upon determination that the at least one extracted feature corresponds to at least one pre-determined feature from the plurality of pre-determined features. Further, the slow-motion reproduction rate is lower than a normal reproduction rate used for viewing the plurality of frames during normal playback.

Embodiments are related to a reproduction apparatus for slow-motion reproduction of video data including a plurality of frames stored on a storage device. The apparatus includes a recording section to receive a frame from the plurality of frames stored on the storage device. The apparatus further includes an extraction section to extract at least one feature from the received frame and compare the at least one extracted feature with a plurality of pre-determined features. The apparatus also includes a reproduction control section to reproduce the received frame at a slow-motion reproduction rate lower than a normal reproduction rate upon determination that the at least one extracted feature corresponds to at least one pre-determined feature from the plurality of pre-determined features. Additionally, the slow-motion reproduction rate is lower than a normal reproduction rate used for viewing the plurality of frames during normal playback.

Embodiments are directed towards a reproduction apparatus for slow-motion reproduction of video data including a plurality of frames stored on a storage device. The apparatus includes means for receiving a frame from the plurality of frames stored on the storage device. The apparatus further includes means for extracting at least one feature from the received frame. The apparatus also includes means for comparing the at least one extracted feature with a plurality of pre-determined features. Additionally, the apparatus includes means for reproducing the received frame at a slow-motion reproduction rate lower than a normal reproduction rate upon determination that the at least one extracted feature corresponds to at least one pre-determined feature from the plurality of pre-determined features. Further, the slow-motion reproduction rate is lower than a normal reproduction rate used for viewing the plurality of frames during normal playback.

Embodiments are related to a non-transitory computer readable storage medium having instructions encoded thereon, which when executed by a processor in reproduction apparatus cause the apparatus to implement a method for slow-motion reproduction of video data including a plurality of frames stored on a storage device. The method includes receiving a frame from the plurality of frames stored on the storage device. The method further includes extracting at least one feature from the received frame. Additionally, the method includes comparing the at least one extracted feature with a plurality of pre-determined features. The method also includes reproducing the received frame at a slow-motion reproduction rate upon determination that the at least one extracted feature corresponds to at least one pre-determined feature from the plurality of pre-determined features. Further, the slow-motion reproduction rate is lower than a normal reproduction rate used for viewing the plurality of frames during normal playback.

BRIEF DESCRIPTION OF THE DRAWINGS

FIG. 2 is a block diagram showing a functional configuration of the reproduction control apparatus according to the embodiment;

FIG. 3 is an explanatory view illustrating contents of a feature pattern table according to the embodiment;

FIG. 4 is an explanatory view illustrating a selection screen shown to a user according to the embodiment;

FIG. 5 is an explanatory view illustrating contents of a parameter table according to the embodiment;

DETAILED DESCRIPTION OF THE EMBODIMENTS

Figure 1:
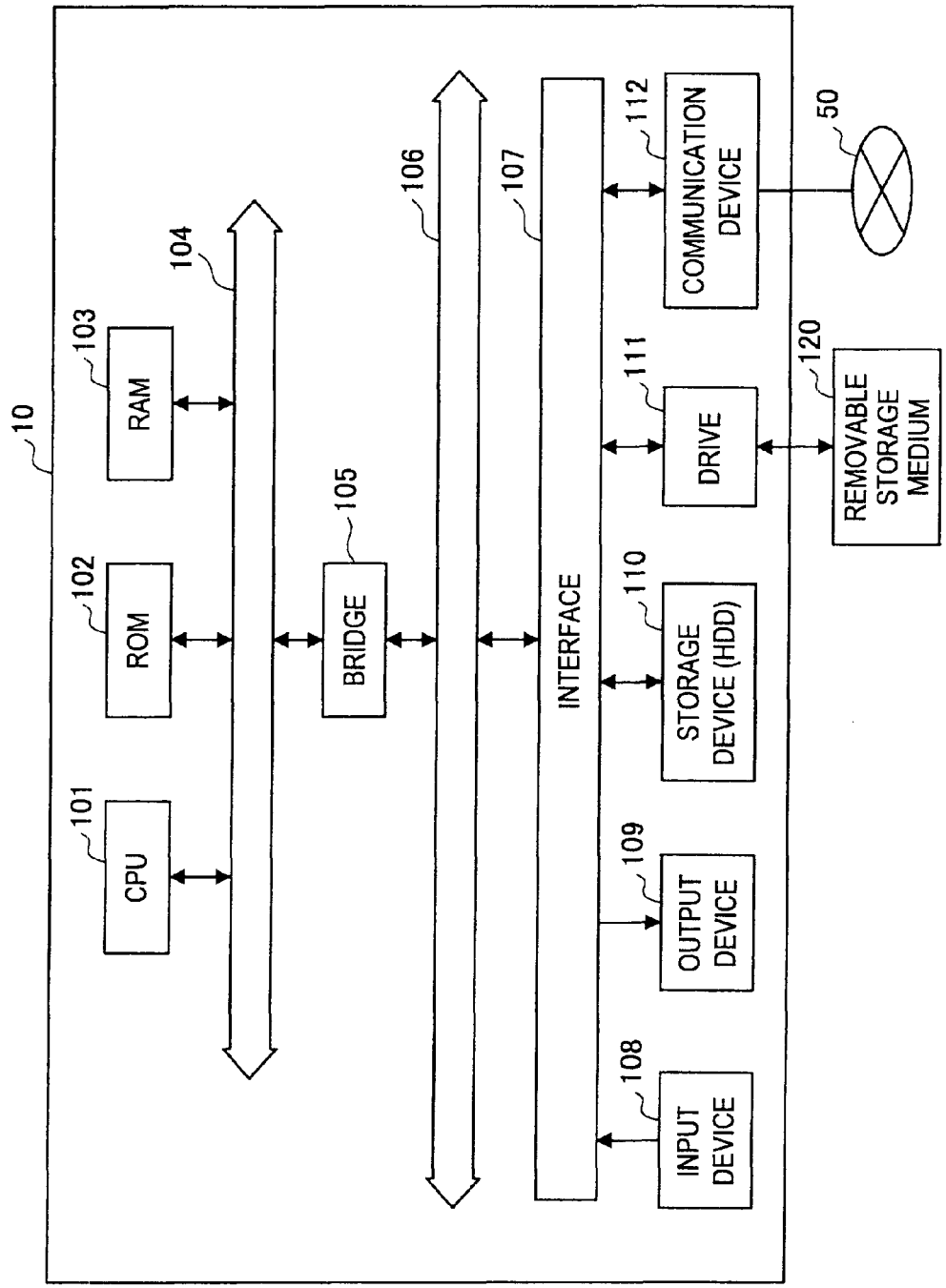
FIG. 1 is an explanatory view showing an example of a hardware configuration of a reproduction control apparatus according to an embodiment of the present invention.

Hereinafter, a preferred embodiment of the present invention will be described in detail with reference to the appended drawings. Note that, in this specification and the appended drawings, structural elements that have substantially the same function and structure are denoted with the same reference numerals, and repeated explanation of these structural elements is omitted.

Further, the "preferred embodiment of the present invention" will be described in the following order.

[1] Object of present embodiment
[2] Hardware configuration of reproduction control apparatus
[3] Functional configuration of reproduction control apparatus
[4] Detail of operation of reproduction control apparatus

[1] Object of Present Embodiment

First, an object of the present embodiment will be described. In recent years, consumer video cameras have been widely used, and it has become common that many people own video cameras at home and keep records of the growth of a child and everyday life such as various kinds of events. As the functions desired for a video camera, there can be exemplified higher image quality of a display device owing to the spreading of Hi-Vision and long-duration recording from a tape or a DVD to a hard disk. Further, there is newly appeared a video camera having functions of photographing at a frame rate higher than a normal frame rate and performing slow-motion reproduction at the time of reproduction.

For example, there is disclosed a technology which, with respect to a moving image generated by changing frame rate, enables to easily adjust a reproduction rate at the time of reproduction. In particular, with regard to a broadcast content, a technique involving performing slow-motion reproduction of an important scene or a highlight scene is widely used. Also from the user side, the technique of slow-motion reproduction enables the user to readily realize an interesting video effect and to enhance a value of video besides the image quality.

Meanwhile, in the past, a user who owned a video camera generally used, when reproducing recorded moving image information, a method of watching/listening to the photographed video by reproducing the video as it was. Among experienced users, there are some people who enjoy value-added video which is edited by adding various kinds of video effects, for example, inserting tickers into photographed content and performing slow-motion reproduction. However, in order to perform those editing operations, there was an issue that a long time period was necessitated even for an experienced user to perform the editing operations, because it was necessary to create a video editing environment such as software and hardware.

In light of the foregoing, a reproduction control apparatus 10 according to the present embodiment is produced. According to the reproduction control apparatus 10 of the present embodiment, a scene that is suitable for slow-motion reproduction can be detected and the scene can be reproduced in slow motion.

Here, an outline of display control processing of the reproduction control apparatus 10 will be described. At the time of reproducing a moving image, the reproduction control apparatus 10 performs reproduction while temporarily accumulating some of moving image frames. The reproduction control apparatus 10 extracts a feature of the moving image from the temporarily accumulated moving image frames, refers to a feature pattern which is set as an effective scene for slow-motion reproduction, and then automatically extracts, from the pattern matching, a scene to which a slow effect is added. As the effective scenes for slow-motion reproduction, there can be exemplified a moment of crossing the finish line on a sports day, a scene of falling in a race, and a moment of a child crying. Further, there can be exemplified scenes that remain in memory such as a landscape seen from a car window and a moment of a bird fluttering up in the sky.

The reproduction control apparatus 10 automatically performs the slow-motion reproduction of the extracted scene to which a slow effect is added. Further, the extracted scene to which a slow effect is added may be provided to the user with a display of characters or the like recommending the slow-motion reproduction. In receiving the provision of the display recommending the slow-motion reproduction, the user instructs the reproduction control apparatus 10 to perform slow-motion reproduction via an input device such as a remote controller. The number of times and the time period for which the slow-motion reproduction is performed are decided based on a parameter which is set beforehand, in a manner that the number of times and the time period are suitable for the extracted scene. The reproduction parameter may be changed depending on the operation of the user.

Further, in the case of slow-motion reproduction, music information is generally not reproduced. In the present embodiment, however, a music which is set beforehand can be reproduced while performing the slow-motion reproduction of a moving image. For example, with respect to each of the feature patterns which is set as an effective scene, music information that is suitable for the scene may be set. Thus, it becomes possible to impart even more impressive effect to the video reproduced in slow motion. The music information reproduced at the time of slow-motion reproduction may be additionally set by the user.

In an editing operation in the past, it has been necessary to find a scene suitable for slow-motion reproduction. In particular, in order to find a scene suitable for slow-motion reproduction from a moving image which has been photographed over a long period of time, it is necessary to reproduce the moving image from the beginning and hence requires a considerable amount of time. However, the reproduction control apparatus 10 according to the present embodiment is capable of automatically extracting a scene suitable for slow-motion reproduction from a photographed moving image. Then, by reproducing the extracted moving image at the time of reproduction in slow motion, the above-mentioned impressive scene can be reproduced effectively. Further, at the time of performing slow-motion reproduction, the reproduction control apparatus 10 may recommend the user to select whether to perform the slow-motion reproduction. Thus, the user can perform the slow-motion reproduction of a desired scene selected from among the automatically extracted impressive scenes.

Further, as the reproduction control apparatus 10, a PC (Personal Computer) can be exemplified, and the reproduction control apparatus 10 is not limited to the PC, and may be video equipment such as an editing device or a reproduction device. In the present embodiment, the reproduction control apparatus 10 is configured as a separate apparatus from an imaging device and a video recording device, and may be also configured in an integrated manner with an imaging device or in an integrated manner with a video recording device. In the present embodiment, the reproduction control apparatus 10 have a configuration in which a video or the like imaged by an imaging device, which is a separate device, is being input from outside.

Further, the reproduction control apparatus 10 may be an information processing apparatus such as a video processing apparatus for home use (such as a DVD recorder and a video cassette recorder), a PDA (Personal Digital Assistants), a game device for home use, and a consumer electronics device. Further, the reproduction control apparatus 10 may also be an information processing apparatus such as a cellular phone, a PHS (Personal Handyphone System), a portable music reproduction device, a portable video processing device, and a portable game device.

[2] Hardware Configuration of Reproduction Control Apparatus

In the above, the object of the present embodiment has been described. Next, with reference to FIG. 1, a hardware configuration of the reproduction control apparatus 10 will be described. FIG. 1 is an explanatory view showing an example of the hardware configuration of the reproduction control apparatus 10 according to the present embodiment.

The reproduction control apparatus 10 includes a CPU (Central Processing Unit) 101, an ROM (Read Only Memory) 102, an RAM (Random Access Memory) 103, a host bus 104, a bridge 105, an external bus 106, an interface 107, an input device 108, an output device 109, a storage device (HDD) 110, a drive 111, and a communication device 112.

The CPU 101 functions as an arithmetic processing unit and a control unit, and controls an entire operation of the reproduction control apparatus 10 in accordance with various kinds of programs. Further, the CPU 101 may be a microprocessor. The ROM 102 stores a program, a calculation parameter, and the like which the CPU 101 uses. The RAM 103 primarily stores a program which is used in the execution of the CPU 101, a parameter which appropriately changes due to the execution, and the like. They are connected to each other via the host bus 104 which includes a CPU bus and the like.

The host bus 104 is connected to the external bus 106 such as a PCI (Peripheral Component Interconnect/Interface) bus via the bridge 105. Note that the host bus 104, the bridge 105, and the external bus 106 are not necessarily provided separately from each other, and the functions thereof may be implemented on one bus.

The input device 108 includes, for example, an input means for a user to input information, such as a mouse, a keyboard, a touch panel, a button, a microphone, a switch, and a lever, and an input control circuit which generates an input signal based on an input from the user and outputs the input signal to the CPU 101. The user of the reproduction control apparatus 10 can input various kinds of data and can instruct a processing operation to the reproduction control apparatus 10 by operating the input device 108.

The output device 109 includes, for example, a display device such as a CRT (Cathode Ray Tube) display device, a liquid crystal display (LCD) device, an OLED (Organic Light Emitting Display) device, and a lamp, and an audio output device such as a speaker and headphones. The output device 109 outputs, for example, reproduced content. Specifically, the display device displays various kinds of information such as reproduced video data in a form of text or image. On the other hand, the audio output device converts reproduced audio data or the like into sound and outputs the sound.

The storage device 110 is a device for storing data, which is configured as an example of a storage section of the reproduction control apparatus 10 of the present embodiment. The storage device 110 can include, for example, a storage medium, a recording device for recording data in the storage medium, a reading device for reading out the data from the storage medium, and a deletion device for deleting the data recorded in the storage medium. The storage device 110 is configured to include, for example, an HDD (Hard Disk Drive). The storage device 110 drives a hard disk and stores a program and various kinds of data executed by the CPU 101.

The drive 111 is a reader/writer for the storage medium and is built in or externally attached to the reproduction control apparatus 10. The drive 111 reads out information recorded in a removable storage medium 120 which is mounted thereto, such as a magnetic disk, an optical disk, a magneto-optical disk, or a semiconductor memory, and outputs the information to the RAM 103.

The communication device 112 refers to, for example, a communication interface which is configured to include a communication device for establishing a connection with a communication network 50. Further, the communication device 112 may be a wireless LAN (Local Area Network) enabled communication device, a wireless USB enabled communication device, or a wired communication device for performing wired communication.

[3] Functional Configuration of Reproduction Control Apparatus

In the above, the hardware configuration of the reproduction control apparatus 10 has been described. Next, with reference to FIG. 2, a functional configuration of the reproduction control apparatus 10 will be described. FIG. 2 is a block diagram showing the functional configuration of the reproduction control apparatus 10. As shown in FIG. 2, the reproduction control apparatus 10 includes a reproduction section 122, a recording section 124, a moving image storage section 126, a table storage section 128, an input section 132, an extraction section 134, a reproduction control section 136, and the like.

The reproduction section 122 has functions of reproducing a moving image and providing the reproduced moving image to the recording section 124. The moving image to be reproduced by the reproduction section 122 may be recorded in a storage device (not shown), which is a separate device from the reproduction control apparatus 10. Examples of the storage device include a magnetic disk such as a tape and an HDD, an optical disk such as a CD, a DVD, and BD, and a semiconductor recording device such as a memory stick, an SD card, a flash memory card, and an SSD. Further, the moving image reproduced by the reproduction section 122 may be input from an imaging device or the like, which is a separate device from the reproduction control apparatus 10.

The reproduction section 122 reproduces a video signal from information of the moving image that is stored in the storage device or from information of the moving image that is input from the imaging device or the like, and provides the video signal to the recording section 124.

The recording section 124 has a function of recording the information of the moving image provided from the reproduction section 122 for a predetermined period of time into the moving image storage section 126. That is, the recording section 124 records the predetermined period of time worth of moving image frames into the moving image storage section 126.

Stored in the table storage section 128 are a feature pattern table 129, a parameter table 130, and the like. The feature pattern table 129 is a table which correlates a feature pattern with each of predetermined scenes. The parameter table 130 is a table which correlates, with the feature pattern, a reproduction parameter corresponding thereto. The feature pattern refers to a feature scene or the like included in the reproduced moving image, to which a slow effect is suitably added.

Here, with reference to FIG. 3, the contents of the feature pattern table 129 will be described. FIG. 3 is an explanatory view illustrating the contents of the feature pattern table 120. As shown in FIG. 3, there can be exemplified a scene of a sports day as the scene to which a slow effect is suitably added. As shown in FIG. 3, as feature patterns of the sports day, there can be exemplified: around October 10th, which is the date when the moving image is photographed, as time information; voices of many children as sound information; blue sky and soil color as color information; and a photographic subject wearing a red-and-white cap, and large number of people. Further, in the case of an entrance ceremony, there can be exemplified: April, which is the month when the moving image is photographed, as the time information; room reverberation and voices of many people as sound information; and an image of a cherry tree being included. In embodiments, the photographic subject information and the color information may be inclusive of each other where information extracted from a scene may be identified as both photographic subject information and color information.

Further, by using a face detection technology, information of a change in the facial expression of a photographic subject may be used as one of the feature patterns. For example, with regard to a scene of a moment of a child crying, information of the facial expression of crying and audio information of the voice of crying may be used as feature patterns. Further, with regard to a scene of a landscape seen from a car window, the size of the velocity vector of the landscape image may be used as a feature pattern. In the same manner, a motion parameter of the motion of a photographic subject may also be used as a feature pattern. For example, with regard to a scene of a bird fluttering up in the sky, a motion parameter of the photographic subject and audio information of the sound of flapping wings may be used as feature patterns.

Further, in a scene of a wedding, audio information such as bridal hymn as sound information may be used as a feature pattern, or a brightness variation of a part of a screen due to the flash may be used as a feature pattern. Further, in the case of a scene in which an object such as a spinning top or a Hula-Hoop rotates, information of a repeating specific pattern may be used as a feature pattern. Further, text information recognized from a reproduced moving image may be used as a feature pattern.

In embodiments, a plurality of pre-determined features further includes one or more detected facial expressions, a threshold associated with a motion of a detected object, or a threshold associated with a change in light brightness from a previous frame included in the plurality of frames. In further embodiments, at least one pre-determined feature from the plurality of pre-determined features is specified by a user.

The extraction section 134, which is to be described later, extracts a moving image that is suitable for slow-motion reproduction based on the feature pattern which is set for each of the scenes. The extraction of the moving image that is suitable for slow-motion reproduction, which is performed by the extraction section 134, will be described in detail later.

Further, what kind of scene is to be reproduced in slow motion may be preliminarily set by the user. For example, a selection screen as illustrated in FIG. 4 may be shown to the user. FIG. 4 is an example of a selection screen shown to a user. For example, in a selection screen 1300, a desired item may be selected from each of a scene 1301, a photographic subject 1302, a motion 1303, and the like. For example, the user may select, as the scene 1301, a scene that the user wants for the slow-motion reproduction from among sports day, journey, entrance ceremony, graduation ceremony, sports, wedding, car window, and the like.

Further, for example, the user may select, as the photographic subject 1302, a photographic subject that the user wants for the slow-motion reproduction from among user, wife, child, animal, vehicle, and the like. Further, the user may select, as the motion 1303, a motion that the user wants for the slow-motion reproduction from among facial expression change, tripping, running, jumping, swinging, and the like. The feature pattern table 129 including the items selected by the user may be generated.

Next, with reference to FIG. 5, the contents of the parameter table 130 will be described. FIG. 5 is an explanatory view illustrating the contents of the parameter table 130. As shown in FIG. 5, in the parameter table 130, slow-motion reproduction parameters indicating in what way the slow-motion reproduction is performed are set for each of the scenes that is suitable for slow-motion reproduction. For example, in the case of a scene of a "sports day" in which a "child" (photographic subject) is "running" (motion), the reproduction parameters are as follows: reproduction rate: double rate; number of reproduction times: once; reproduction time period: 10 seconds; reproduction start position: 5 seconds before; and music: ON. Accordingly, the reproduction control section 136, which is to be described later, performs the slow-motion reproduction of the moving image based on those reproduction parameters. The slow-motion reproduction of the moving image performed by the reproduction control section 136 will be described in detail later.

Returning to FIG. 2, the description of the functional configuration of the reproduction control apparatus 10 is continued. The input section 132 has a function of accepting input by an operation of a user, and is an example of the input device 108 described above. The input section 132 accepts a slow-motion reproduction-start instruction, which is to be described later, by the operation of the user, for example.

The extraction section 134 has a function of extracting a feature pattern which corresponds to the feature pattern in the feature pattern table 129 and which is included in the moving image frames stored in the moving image storage section 126. As described above, the predetermined period of time worth of moving image frames are recorded in the moving image storage section 126. Consequently, the extraction section 134 extracts a feature pattern of the moving image from the predetermined period of time worth of moving image frames. Then, the extracted feature pattern and the feature pattern stored in the feature pattern table 129 are compared with each other. In the case where the feature pattern extracted from the moving image and the feature pattern stored in the feature pattern table 129 correspond to each other, information of the moving image is provided to the reproduction control section 136.

The extraction of the feature pattern of the moving image may be performed by a feature extractor with preliminarily learned feature patterns. That is, regardless of scene, in the cases of detecting a smiling face, a face of a specific individual, a motion of an object which is faster than a predetermined rate, and a change in brightness, they are extracted as feature patterns.

Further, as described above, in the case where the feature pattern is preliminarily set by the user, it is determined whether the feature pattern extracted from the moving image and the feature pattern preliminarily set by the user correspond to each other. The selection of the feature pattern by the user may be performed before or during the reproduction of the moving image. When the feature pattern is selected by the user, there is extracted a moving image which is matched, not to all the feature scenes stored in the feature pattern table 129, but to a user's desired scene.

Further, there is considered a case where the effect due to camera shake or operation mistake at the time of photographing is recognized as a feature pattern of the moving image. In this case, for example, a feature of an unfocused moving image and a feature of a moving image with camera shake are preliminarily being stored, and when a feature of a moving image corresponds to the features of those stored moving images, the moving image may be regarded as the one in which the camera shake or the operation mistake is occurred and may be eliminated. The feature of the unfocused moving image can be detected from a spatial frequency and the like. Further, the scene with camera shake can be detected from a motion vector in the vertical direction within the entire video.

The reproduction control section 136 has a function of causing a display device 20 to reproduce the moving image frames provided from the extraction section 134, based on the reproduction parameter corresponding to the feature pattern of the moving image. As described above, in the parameter table 130, reproduction parameters are correlated with feature patterns of scenes that are effective for slow-motion reproduction. Therefore, the reproduction control section 136 causes the moving image frames provided from the extraction section 134 to be reproduced in slow motion. For example, in the case of a scene of a "sports day" in which a "child" is "running" is set to be reproduced at "double rate", the moving image frames are reproduced at a rate twice as slow. In the same manner, the number of reproduction times, the reproduction time period, and the reproduction start position are also determined based on the number of times, the time period, and the like set as the reproduction parameters, and the scene is reproduced in slow motion.

Figure 6:
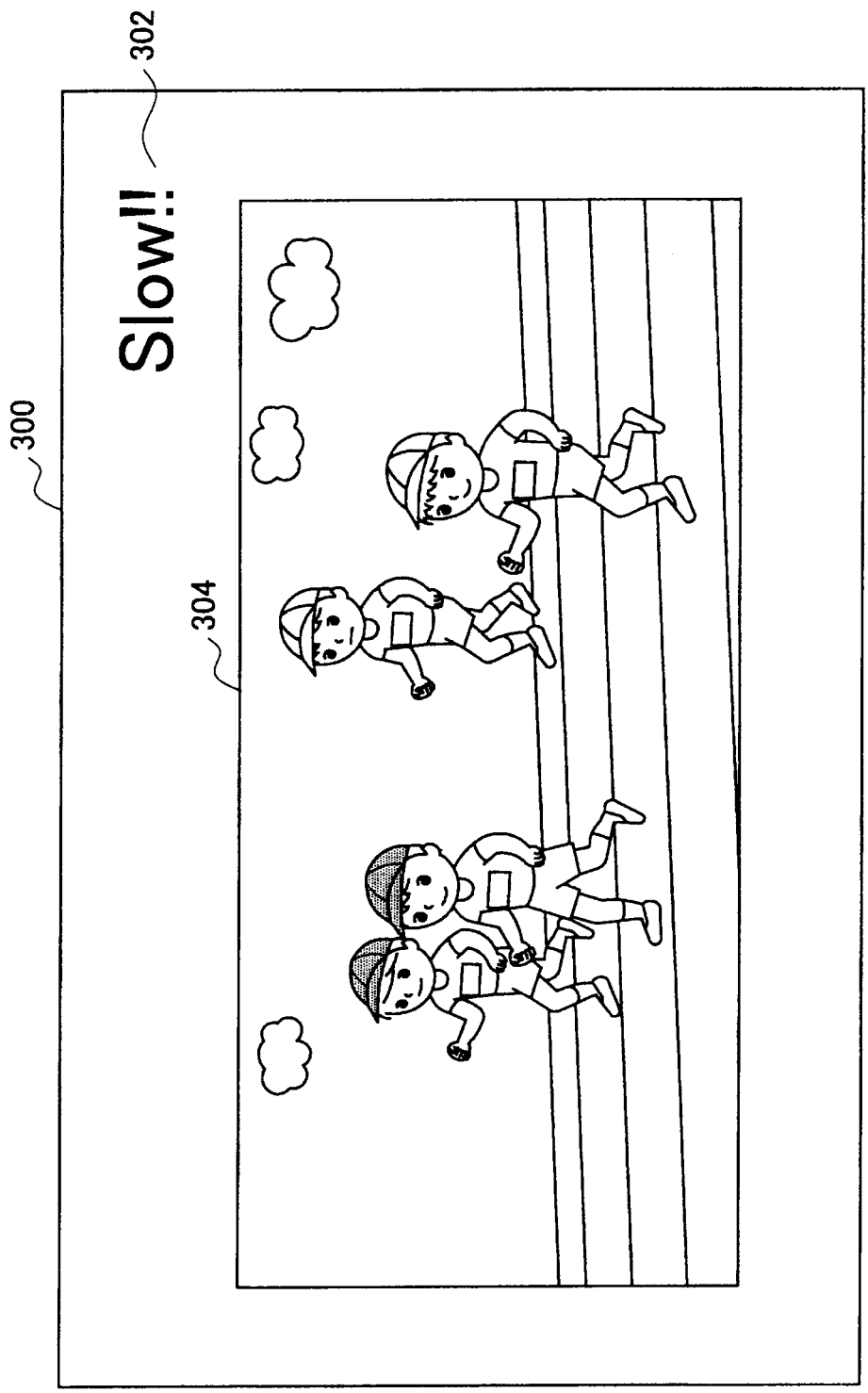
FIG. 6 is an explanatory view illustrating a slow-reproduction screen according to the embodiment.

In FIG. 6, a slow-reproduction screen displayed on the display device 20 by the reproduction control section 136 will be described. FIG. 6 is an explanatory view illustrating the slow-reproduction screen displayed on the display device 20. FIG. 6 is an example of a display screen on which a scene of children running in a sports day is reproduced in slow motion. As shown in FIG. 6, on a display screen 300, a moving image 304 in which four children each wearing a red or white cap are running is displayed, and the word "SLOW!!" is displayed on the upper part of the display screen 300.

The display of "SLOW!!" on the upper part of the display screen 300 indicates that the moving image 304 is being reproduced in slow motion. As described above, the reproduction rate of the moving image 304 and a reproduction range of the moving image 304 are determined based on the reproduction parameters stored in the parameter table 130, the reproduction range including a reproduction time period, a reproduction start position, and a reproduction end position. When the scene of children running in a sports day is reproduced in slow motion, it becomes possible to more effectively reproduce an impressive scene than in the case of imaging a scene of the sports day and reproducing the scene in a usual manner.

Figure 7:
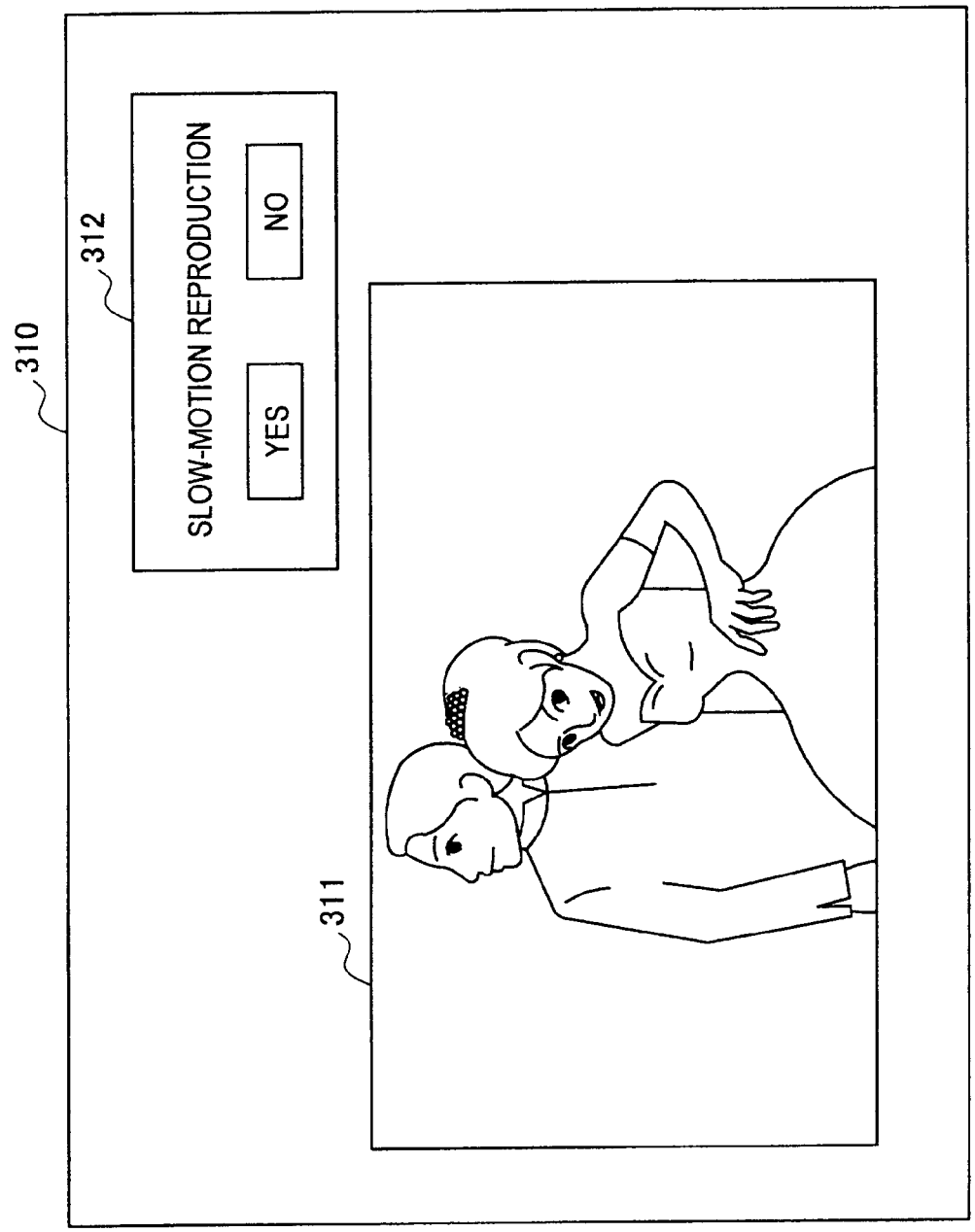
FIG. 7 is an explanatory view illustrating a slow-motion reproduction-start instruction screen according to the embodiment.

Further, the reproduction control section 136 may cause a start instruction screen for the user to input the start instruction of slow-motion reproduction to be displayed at the time of performing slow-motion reproduction of the moving image. Here, with reference to FIG. 7, a slow-motion reproduction-start instruction screen will be described. FIG. 7 is an explanatory view illustrating the slow-motion reproduction-start instruction screen. As shown in FIG. 7, for example, in the case where a moving image of a scene of a wedding corresponds to a feature pattern stored in the feature pattern table, the moving image of the scene of the wedding is reproduced in slow motion as a screen that is suitable for slow-motion reproduction on a display screen 310. At that time, a start instruction screen 312 for selecting whether to start the slow-motion reproduction may be displayed on the upper part of the display screen.

Consequently, a screen that is suitable for slow-motion reproduction is extracted from the extraction section 134, and at the time of reproduction by the reproduction control section 136, the screen can be reproduced in slow motion depending on a selection made by the user. Therefore, not all of the feature scenes are reproduced in slow motion, and only a desired feature scene which is selected by the user is reproduced in slow motion. The start instruction screen 312 is shown to the user together with a moving image 131 of a wedding, and the user selects "Yes" in the case of performing slow-motion reproduction and selects "No" in the case of not performing slow-motion reproduction.

In the case where "Yes" is selected by the user input, the reproduction control section 136 causes the moving image 131 of the wedding to be reproduced in slow motion based on the reproduction parameters. Further, in the case where "No" is selected by the user input, the reproduction control section 136 causes the moving image 131 of the wedding to be reproduced at a normal rate. Further, the reproduction control section 136 may cause a start instruction screen including a reproduction parameter to be displayed together with a moving image that is suitable for slow-motion reproduction. For example, a reproduction rate, a number of reproduction times, a reproduction time period, and the like are displayed together with the moving image, and the user may select them. For example, a numerical value of a parameter of the reproduction rate or the like suitable for each scene is displayed on the display screen as a default, and the numerical value may be increased or decreased by the user. Further, the numerical value of the parameter may be changed by touching the screen or by pressing an arrow key on the keyboard during slow-motion reproduction.

In the case where the numerical value of the parameter of the reproduction rate or the like is changed by the user, the reproduction control section 136 causes the moving image to be reproduced in slow motion based on the changed numerical value of the parameter. Further, in the case where a parameter for providing music information that is suitable for the moving image is set, whether to reproduce the music information which is set with the slow-motion reproduction of the moving image may allowed to be selected. In addition, preliminarily set music information may be changed depending on the operation of the user. Further, the music information changed by the operation of the user may be stored by being associated newly with a scene of a feature moving image.

Figure 8:
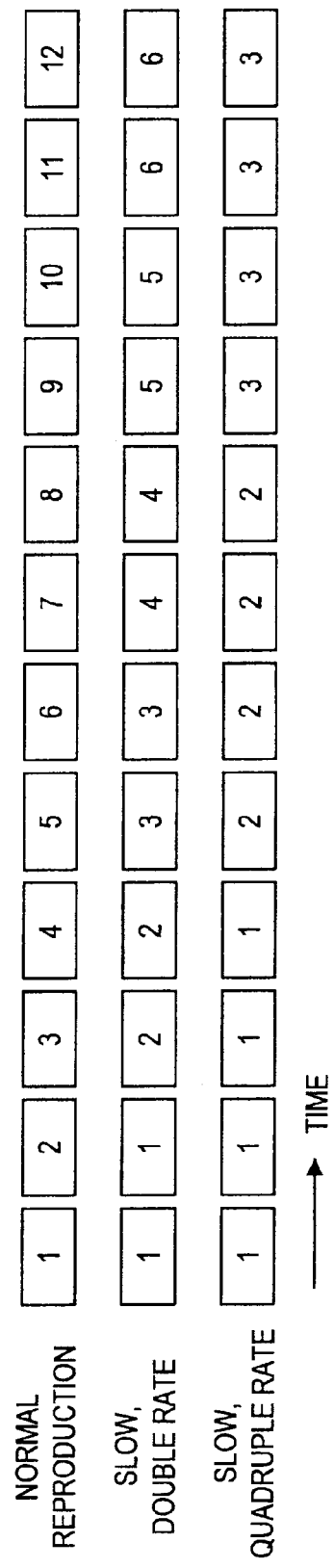
FIG. 8 is an explanatory view illustrating generation of moving image frames according to the embodiment.

Next, generation of moving image frames performed by the reproduction control section 136 will be described. FIG. 8 is an explanatory view illustrating generation of the moving image frames performed by the reproduction control section 136. As shown in FIG. 8, in the case of reproducing the moving image frames at double rate, the reproduction control section 136 duplicates each frame included in the series of frames from a moving image frame at the start of the slow-motion reproduction to a moving image frame at the end of the slow-motion reproduction, and provides the frames to the display device 20.

For example, when the slow-motion reproduction is performed in a range of moving image frames "1" to "6", twice the number of the moving image frames "1" to "6" are generated, and the moving image frames are reproduced in the order of "112233445566". In this way, the moving image in the range of "1" to "6" is reproduced by the display device 20 at a rate twice as slow. In the same manner, in the case of reproduction at quadruple rate, four times the number of moving image frames that are to be used for slow-motion reproduction are generated, and the moving image frames are provided to the display device 20. As described above, the rate for the slow-motion reproduction may be changed during the slow-motion reproduction. Further, the slow-motion reproduction may be stopped after the start thereof, followed by a reproduction at a normal rate.

[4] Detail of Operation of Reproduction Control Apparatus

Figure 9:
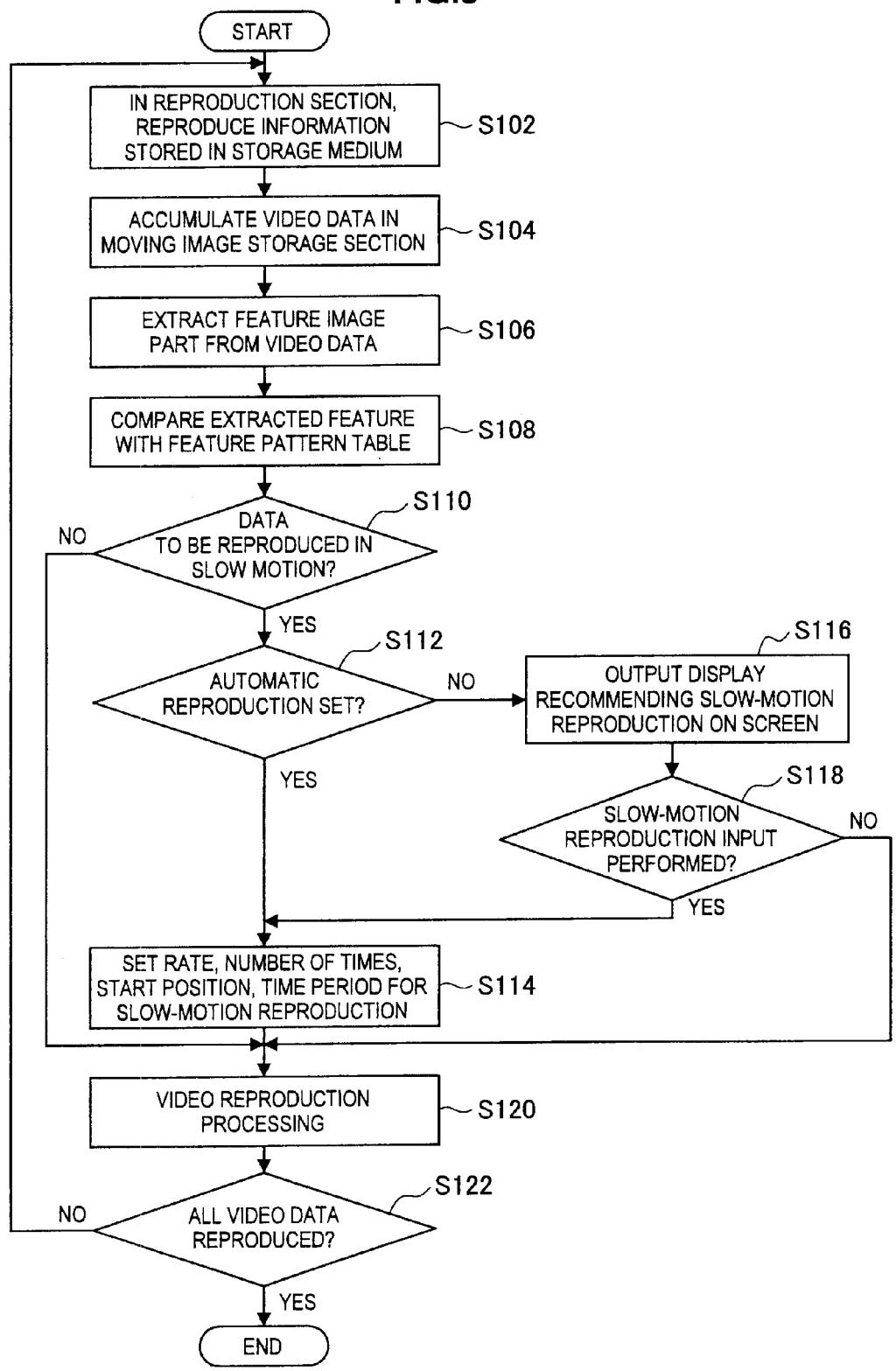
FIG. 9 is a flowchart showing a detail of operation of the reproduction control apparatus according to the embodiment.

In the above, the functional configuration of the reproduction control apparatus 10 has been described. Next, with reference to FIG. 9, a detail of operation of the reproduction control apparatus 10 will be described. FIG. 9 is a flowchart showing the detail of the operation of the reproduction control apparatus 10.

As shown in FIG. 9, first, the reproduction section 122 reproduces information of a moving image stored in a storage medium such as a magnetic disk (S102). As described above, the moving image reproduced in Step S102 may be stored in the storage medium or may be input from a device, which is separately provided from the reproduction control apparatus 10, by stream distribution.

After that, the recording section 124 accumulates video data (moving image frames) in the moving image storage section 126 (S104). The extraction section 134 extracts, from the video data extracted in Step S104, a feature image part (S106). As the feature image part extracted in Step S106, there are exemplified, as described above, an image including a smiling face or a crying face that is extracted by a feature extractor which detects facial expressions, and an image including a face of a specific individual that is extracted by a feature extractor which recognizes a face of a specific individual. Further, an image including an object whose motion is faster than a predetermined rate may also be extracted by using a feature extractor which detects a motion of an object. Still further, an image in which a large amount of flashlight is used may be extracted by extracting an image having large variation in brightness.

Next, the feature pattern extracted in Step S106 and a feature pattern stored in the feature pattern table 129 are compared with each other (S108). As described above, feature patterns of a scene that is suitable for slow-motion reproduction are stored in the feature pattern table 129. Therefore, the moving image is suitable for slow-motion reproduction, when the feature pattern included therein corresponds to the feature pattern stored in the feature pattern table 129. From the result of comparing the feature pattern of the extracted moving image with the feature pattern stored in the feature pattern table 129 in Step S108, it is determined whether the video data is to be reproduced in slow motion (S110).

In Step S110, in the case where it is determined that the video data extracted by the extraction section 134 is to be reproduced in slow motion, it is determined whether automatic reproduction is set (S112). In Step S112, whether the automatic reproduction is set may be set with a reproduction table of each scene in the parameter table, or may be set by associating whether to perform the automatic reproduction with each scene in the feature pattern table. In Step S110, in the case where it is determined that the video data extracted by the extraction section 134 is not to be reproduced in slow motion, processing of Step S120 is executed. The processing of Step S120 will be described later.

In Step S112, in the case where it is determined that the video data extracted by the extraction section 134 is a video data in which the automatic reproduction is set, the reproduction rate, the number of reproduction times, the reproduction start position, the reproduction time period, and the like for the slow-motion reproduction are set, based on the parameter table 130 (S114).

In Step S112, in the case where it is determined that the video data extracted by the extraction section 134 is a video data in which the automatic reproduction is not set, a display recommending the slow-motion reproduction is output on the display screen (S116). In Step S116, the display recommending the slow-motion reproduction may be displayed together with video data that is suitable for slow-motion reproduction. Then, it is determined whether a slow-motion reproduction input is performed by the user (S118).

Then, in Step S118, in the case where it is determined that the slow-motion reproduction input is performed by the user, the reproduction rate, the number of reproduction times, the reproduction start position, the reproduction time period, and the like for the slow-motion reproduction are set, based on the parameter table 130 (S114). In Step S118, in the case where it is determined that the slow-motion reproduction input is not performed by the user, the processing of Step S120 is executed.

Then, in Step S120, video reproduction processing is executed (S120). In Step S120, as described above, in the case where the slow-motion reproduction parameters such as the slow-motion reproduction rate are set in Step S114, the video data is reproduced in slow motion. On the other hand, in the case where the slow-motion reproduction parameters such as the slow-motion reproduction rate are not set, the video data is reproduced at a normal rate. After that, it is determined whether all the video data is reproduced (S122), and in the case where not all the video data is reproduced, the processing returns to Step S102. In Step S122, in the case where all the video data is reproduced, the processing is completed.

In the above, the detail of the operation of the reproduction control apparatus 10 has been described. According to the present embodiment, it becomes possible to extract, from reproduced moving image frames, a feature pattern corresponding to a feature pattern table, and to perform the slow-motion reproduction of the moving image frames based on the reproduction parameter corresponding to the feature pattern. Thus, it becomes possible to automatically extract a moving image that is suitable for slow-motion reproduction, and to reproduce the moving image at a reproduction rate or the like that is suitable for the scene of the moving image. It becomes possible for the user to perform high value-added reproduction by, without editing or processing of the imaged moving image, causing the reproduction control apparatus to automatically perform the slow-motion reproduction of an impressive scene.

In the above, the preferred embodiment of the present invention has been described in detail with reference to the appended drawings, but is not limited thereto. It should be understood by those skilled in the art that various modifications, combinations, sub-combinations and alterations may occur depending on design requirements and other factors insofar as they are within the scope of the appended claims or the equivalents thereof.

For example, respective steps included in the processing of the reproduction control apparatus 10 according to the present specification are not necessarily processed in chronological order in accordance with the flowchart. For example, the respective steps included in the processing of the reproduction control apparatus 10 may be executed in a different order from the described flowchart order or may be executed in a parallel manner.

Further, it is also possible to create a computer program for causing hardware such as the CPU 101, the ROM 102, and the RAM 103 built in the reproduction control apparatus 10 to realize a function equivalent to the function of each configuration of the reproduction control apparatus 10. Further, there is provided a storage medium in which the computer program is stored. Further, when respective functional blocks shown in the functional block diagram of FIG. 2 are configured by hardware, the series of processing can be realized by the hardware.

What is claimed is:

1. A computer-implemented method for slow-motion reproduction of video data including a plurality of frames stored on a storage device, the method comprising:
   receiving a frame from the plurality of frames stored on the storage device;
   extracting at least one feature from the received frame;
   comparing the at least one extracted feature with a plurality of pre-determined features; and
   reproducing the received frame and one or more consecutive frames preceding the received frame at a slow-motion reproduction rate upon determination that the at least one extracted feature corresponds to at least one pre-determined feature from the plurality of pre-determined features, wherein
   the slow-motion reproduction rate is lower than a normal reproduction rate used for viewing the plurality of frames during normal playback, the slow-motion reproduction rate being pre-selected from a plurality of slow-motion reproduction rates by a user and being pre-associated with the at least one extracted feature by the user.

2. The computer-implemented method according to claim 1, further comprising:
   determining whether a parameter indicating automatic reproduction is set upon determination that the at least one extracted feature corresponds to at least one pre-determined feature from the plurality of pre-determined features.

3. The computer-implemented method according to claim 2, further comprising:
   presenting an option to the user to reproduce the received frame at the slow-motion reproduction rate upon determination that the parameter indicating automatic reproduction is not set;
   reproducing the received frame at the normal reproduction rate upon determination that the user presented option is not selected; and
   reproducing the received frame at the slow-motion reproduction rate upon determination that the user presented option is selected.

4. The computer-implemented method according to claim 2, further comprising:
   automatically reproducing the received frame at the slow-motion reproduction rate upon determination that the parameter indicating automatic reproduction is set.

5. The computer-implemented method according to claim 1, further comprising:
   setting at least one reproduction parameter associated with the received frame to reproduce the received frame at the slow-motion reproduction rate.

6. The computer-implemented method according to claim 5, wherein the at least one reproduction parameter associated with the received frame specifies a number of times the received frame is repeated to reproduce the received frame at the slow-motion reproduction rate.

7. The computer-implemented method according to claim 5, wherein the at least one reproduction parameter associated with the received frame specifies a start position of a set of frames including the received frame, each frame included in the set of frames reproduced at the slow-motion reproduction rate.

8. The computer-implemented method according to claim 1, further comprising:
   identifying a scene associated with the received frame; and
   extracting a plurality of features from the received frame, wherein
   the plurality of pre-determined features associates at least one of a photographic subject information, time information, sound information, and color information with a pre-determined scene, and
   the received frame is reproduced at the slow-motion reproduction rate upon determination that the identified scene corresponds to the pre-determined scene and the extracted plurality of features correspond to the photographic subject information, time information, sound information, or color information associated with the pre-determined scene.

9. The computer-implemented method according to claim 1, wherein the plurality of pre-determined features further includes one or more detected facial expressions, a threshold associated with a motion of a detected object, or a threshold associated with a change in light brightness from a previous frame included in the plurality of frames.

10. The computer-implemented method according to claim 1, wherein at least one pre-determined feature from the plurality of pre-determined features is specified by the user.

11. A reproduction apparatus for slow-motion reproduction of video data including a plurality of frames stored on a storage device, the apparatus comprising:
   a recording section to receive a frame from the plurality of frames stored on the storage device;
   an extraction section to extract at least one feature from the received frame and compare the at least one extracted feature with a plurality of pre-determined features; and
   a reproduction control section to reproduce the received frame and one or more consecutive frames preceding the received frame at a slow-motion reproduction rate lower than a normal reproduction rate upon determination that the at least one extracted feature corresponds to at least one pre-determined feature from the plurality of pre-determined features, wherein
   the slow-motion reproduction rate is lower than a normal reproduction rate used for viewing the plurality of frames during normal playback, the slow-motion reproduction rate being pre-selected from a plurality of slow-motion reproduction rates by a user and being pre-associated with the at least one extracted feature by the user.

12. The apparatus according to claim 11, wherein the reproduction control section determines whether a parameter indicating automatic reproduction is set upon determination that the at least one extracted feature corresponds to at least one pre-determined feature from the plurality of pre-determined features.

13. The apparatus according to claim 12, wherein the reproduction control section is configured to:
present an option to the user to reproduce the received frame at the slow-motion reproduction rate upon determination that the parameter indicating automatic reproduction is not set,
reproduce the received frame at the normal reproduction rate upon determination that the user presented option is not selected, and
reproduce the received frame at the slow-motion reproduction rate upon determination that the user presented option is selected.

14. The apparatus according to claim 12, wherein the reproduction control section automatically reproduces the received frame at the slow-motion reproduction rate upon determination that the parameter indicating automatic reproduction is set.

15. The apparatus according to claim 11, wherein the reproduction control section sets at least one reproduction parameter associated with the received frame to reproduce the received frame at the slow-motion reproduction rate.

16. The apparatus according to claim 15, wherein the at least one reproduction parameter associated with the received frame specifies a number of times the received frame is repeated to reproduce the received frame at the slow-motion reproduction rate.

17. The apparatus according to claim 15, wherein the at least one reproduction parameter associated with the received frame specifies a start position of a set of frames including the received frame, each frame included in the set of frames reproduced at the slow-motion reproduction rate.

18. The apparatus according to claim 11, wherein
the extraction section identifies a scene associated with the received frame,
the extraction section extracts a plurality of features from the received frame,
the plurality of pre-determined features associates at least one of a photographic subject information, time information, sound information, and color information with a pre-determined scene, and
the reproduction control section reproduces the received frame at the slow-motion reproduction rate upon determination that the identified scene corresponds to the pre-determined scene and the extracted plurality of features correspond to the photographic subject information, time information, sound information, or color information associated with the pre-determined scene.

19. A reproduction apparatus for slow-motion reproduction of video data including a plurality of frames stored on a storage device, the apparatus comprising:
means for receiving a frame from the plurality of frames stored on the storage device;
means for extracting at least one feature from the received frame;
means for comparing the at least one extracted feature with a plurality of pre-determined features; and
means for reproducing the received frame and one or more consecutive frames preceding the received frame at a slow-motion reproduction rate lower than a normal reproduction rate upon determination that the at least one extracted feature corresponds to at least one pre-determined feature from the plurality of pre-determined features, wherein
the slow-motion reproduction rate is lower than a normal reproduction rate used for viewing the plurality of frames during normal playback, the slow-motion reproduction rate being pre-selected from a plurality of slow-motion reproduction rates by a user and being pre-associated with the at least one extracted feature by the user.

20. A non-transitory computer readable storage medium having instructions encoded thereon, which when executed by a processor in a reproduction apparatus causes the apparatus to implement a method for slow-motion reproduction of video data including a plurality of frames stored on a storage device, the method comprising:
receiving a frame from the plurality of frames stored on the storage device;
extracting at least one feature from the received frame;
comparing the at least one extracted feature with a plurality of pre-determined features; and
reproducing the received frame and one or more consecutive frames preceding the received frame at a slow-motion reproduction rate lower than a normal reproduction rate upon determination that the at least one extracted feature corresponds to at least one pre-determined feature from the plurality of pre-determined features, wherein
the slow-motion reproduction rate is lower than a normal reproduction rate used for viewing the plurality of frames during normal playback, the slow-motion reproduction rate being pre-selected from a plurality of slow-motion reproduction rates by a user and being pre-associated with the at least one extracted feature by the user.

* * * * *